(12) United States Patent
Cherukuri et al.

(10) Patent No.: US 8,433,757 B2
(45) Date of Patent: Apr. 30, 2013

(54) CENTRALIZED MANAGEMENT OF APPLICATIONS AND DESKTOP PREFERENCES WITHOUT REQUIRING CONFIGURATION OF CLIENTSIDE OPERATING SYSTEMS

(76) Inventors: Rao Cherukuri, Los Altos Hills, CA (US); Karthik Guruswamy, San Jose, CA (US); Kumar Prabhat, San Jose, CA (US); Santosh Kumar, San Jose, CA (US)

( * ) Notice: Subject to any disclaimer, the term of this patent is extended or adjusted under 35 U.S.C. 154(b) by 492 days.

(21) Appl. No.: 12/143,929

(22) Filed: Jun. 23, 2008

(65) Prior Publication Data

US 2009/0043840 A1 Feb. 12, 2009

Related U.S. Application Data

(60) Provisional application No. 60/936,875, filed on Jun. 22, 2007.

(51) Int. Cl.
*G06F 15/16* (2006.01)
*H04L 9/32* (2006.01)
*G06F 3/00* (2006.01)
*G06F 13/00* (2006.01)

(52) U.S. Cl.
USPC ............. 709/205; 713/173; 715/738; 725/60

(58) Field of Classification Search ........... 709/204–207
See application file for complete search history.

(56) References Cited

U.S. PATENT DOCUMENTS

| 6,874,021 | B1 * | 3/2005 | Liu et al. | 709/223 |
|---|---|---|---|---|
| 7,418,665 | B2 * | 8/2008 | Savage | 715/763 |
| 2005/0273486 | A1 * | 12/2005 | Keith | 709/200 |
| 2006/0010325 | A1 * | 1/2006 | Liu et al. | 713/173 |
| 2006/0048194 | A1 * | 3/2006 | Poslinski | 725/81 |

* cited by examiner

*Primary Examiner* — Ashok Patel
*Assistant Examiner* — Evans Desrosiers
(74) *Attorney, Agent, or Firm* — Raj Abhyanker, P.C.

(57) ABSTRACT

A method, apparatus and system of centralized management of applications and desktop preferences without requiring configuration of client-side operating systems are disclosed. In one embodiment, a method of a rich client device includes accessing an application installed on a server, and executing the application from the rich client device without installing the application on the rich client device (e.g., that may mean that an operating system of the rich client device is not modified to perform the function calls between the application and the operating system) when requested by a user of the rich client device through a binary module (e.g., the binary module may include required resources between the application and the operating system including a file system data, a Dynamic-Link library (DLL) data, etc.) of the server that emulates a set of function calls between the application and an operating system of the rich client device.

11 Claims, 10 Drawing Sheets

| USER 402 | DESKTOP PREFERENCES 404 | ACCESS 406 | APPLICATION 408 | FUNCTIONS REQUIRED 410 | EMULATION TYPE 412 | OTHER 414 |
|---|---|---|---|---|---|---|
| JOHN | BLUE ICONS | YES | COMPRESSION SOFTWARE | XYZ.DLL | RICH-CLIENT | ZIP FILE |
| BILL | GREEN BACKGROUND | NO | MEDIA PLAYER | SYSTEM DATA | RICH-CLIENT | SONGS |
| JACK | FOLDER FILE ARRANGE 'B' | YES | DATABASE | REGISTRY DATA | THIN-CLIENT | GAME |
| ... | ... | ... | ... | ... | ... | ... |

← TABLE 400

FIGURE 9

CENTRALIZED MANAGEMENT OF APPLICATIONS AND DESKTOP PREFERENCES WITHOUT REQUIRING CONFIGURATION OF CLIENTSIDE OPERATING SYSTEMS

PRIORITY CLAIM

This application claims priority from U.S. Provisional Patent Application No. 60/936,875 titled "NETWORK DEPLOYMENT OF VIRTUALIZED DESKTOPS" filed on Jun. 22, 2007.

FIELD OF TECHNOLOGY

This disclosure relates generally to an enterprise method, a technical field of software and/or hardware technology and, in one example embodiment, to a method, apparatus and system of centralized management of applications and desktop preferences without requiring configuration of client-side operating systems.

BACKGROUND

An application may be installed through an operating system (e.g., Microsoft® Windows®, Apple® MacOS, Linux, Solaris®, etc.) of a client device (e.g., a rich client device such as a personal computer and/or a laptop, a thin client device such as a workstation and/or a mobile device, etc.). The application may require customization certain aspects (e.g., DLL file changes, etc.) of the operating system to operate with the client device. Furthermore, a user of the client device may customize a desktop (e.g., a workspace) of the operating system (e.g., a look and feel of a file system, position of files and folders, a color scheme, a background, a security preference, etc.) to the user's likeness (e.g., preference, privacy requirement, etc.).

An administrator (e.g., network administrator) may employ a centralized policy management methodology (e.g., central management of passwords and privileges) to control access to the client device. The network administrator may manage numerous (e.g., hundreds, thousands, etc.) ones of client devices and/or users simultaneously. If the user leaves an organization (e.g., a corporation, a university, etc.) employing the user and/or if the operating system of the client device needs to be reinstalled (e.g., becomes corrupted), the administrator may need to manually reconstruct the desktop for the user (e.g., to discover content). Furthermore, the administrator may need to manually update (e.g., reinstall, install a patch, upgrade, etc.) the application on the client device during such instances. It may be cost prohibitive for the organization to employ enough administrators to manually service each client device and each user. Furthermore, hundreds of hours may be wasted in manually configuring desktops and in manually installing updates on client devices. This may cost the organization time, money and effort.

SUMMARY

A method, apparatus and system of centralized management of applications and desktop preferences without requiring configuration of client-side operating systems are disclosed. In one aspect, a method of a rich client device includes accessing an application installed on a server, and executing the application from the rich client device without installing the application on the rich client device without installing the application on the rich client device (e.g., may mean that the operating system of the rich client device may not be modified to perform the function calls between the application and the operating system) when requested by a user of the rich client device through a binary module (e.g., the binary module may include required resources between the application and the operating system including a registry data, a file system data, and/or a Dynamic-Link library (DLL) data) of the server that emulates a set of function calls between the application and an operating system of the rich client device.

The method may include downloading an application component to the rich client device when requested by a user of the rich client device to a memory of the rich client device. The method may include deleting the application from the memory of the rich client device when the application executing on the rich client device is inactive to prevent unauthorized duplication and access of the application. The method may include determining, through the server, that a thin client device is coupled with the server. The method may also include executing the application directly from a virtual machine through the binary module of the server emulating a set of function calls between the application and an operating system of the server without downloading the application to the thin client device.

The method may include recreating a look and feel of a desktop preference (e.g., the desktop preference may include an arrangement of files and folders in a file system, a color scheme of the file system, a background of the file system, an icon of the file system, an access control preference of the file system, a security preference of the file system, a bookmark associated with the user, a temporary file of the file system, a configuration of applications associated with the user and/or a usability preference associated with the user) of the user through a virtual desktop module of the server.

The method may include capturing and storing the desktop preference to a user specific area of the server when the desktop preference is in use on the thin client device and the rich client device. The method may also include presenting the look and feel of the desktop preference of the user through the rich client device, the thin client device, and other devices based on an authentication of the user with a central policy management module of a network coupled with the server, the rich client device and the thin client device. A template module of the binary module may be used to segment an application space from a user profile space on the server. Each operating system of the different client devices may be a same type of operating system as a selected one optimized to operate through the binary module.

In addition, the method may include enabling an administrator of the central policy management module of the network to combine desktops of multiple users of different client devices into a single virtualization layer (e.g., such that the administrator may be able to simultaneously and/or concurrently update the application across each of the multiple users). The update may be a patch installation to the application and/or an upgrade of the application.

The method may include applying a rules engine module of the binary module to determine whether a particular function call needs to be routed to which of the operating system of the rich client device and the required resources of the binary module.

In another aspect, a system includes a server having an application installed impendent of any client-side operating system through a binary module of the server, a network, and a rich client device to access the application installed on the server through the network and to execute the application from the rich client device without installing the application on the rich client device (e.g., the without installing the application on the rich client device may mean that the operating system of the rich client device is not modified to perform the function calls between the application and the operating system) when requested by a user of the rich client device through the binary module of the server that emulates a set of function calls between the application and the operating system of the rich client device.

The rich client device may download the application to the rich client device when requested by a user of the rich client device to a memory of the rich client device, and to delete the application from the memory of the rich client device when the rich client device is inactive to prevent unauthorized duplication and access of the application. The server to determine that the rich client device may be a thin client device, and to execute the application directly from the server through the binary module emulating a set of function calls between the application and the operating system of the server without downloading the application to the thin client device when the rich client device is the thin client device.

In yet another aspect, a method of a server includes determine that a coupled device is at least one of a rich client device and a thin client device based on at least one a memory, microprocessor, and an identification information of the coupled device, executing an application from the rich client device without installing the application on the rich client device when requested by a user of the rich client device through a binary module of the server that emulates a set of function calls between the application and an operating system of the rich client device, and executing the application directly from a virtual machine through the binary module emulating a set of function calls between the application and the operating system of the server without downloading the application to the thin client device when requested by the user of the thin client device.

The method may include recreating a look and feel of a desktop preference (e.g., the desktop preference may include an arrangement of files and folders in a file system, a color scheme of the file system, a background of the file system, an icon of the file system, an access control preference of the file system, a security preference of the file system, a bookmark associated with the user, a configuration of applications associated with the user, a temporary file of the file system, and/or a usability preference associated with the user) of the user through a virtual desktop module of the server. The method may also include presenting the look and feel of the desktop preference of the user through the rich client device based on an authentication of the user with a central policy management module of a network coupled with the server and the rich client device and applying a template module to segment an application space from a user profile space on the server.

In addition, the method may also include enabling an administrator of the central policy management module of the network to use the template module to combine desktops of multiple users of different client devices into a single virtualization layer such that the administrator is able to simultaneously and/or concurrently update (e.g., the update may include a patch installation to the application and/or an upgrade of the application) the application across each of the multiple users. A template module may be used to segment an application space from a user profile space on the server. Each operating system of the different client devices may be a same type of operating system as a selected one optimized to operate through the binary module.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of centralized management of applications and desktop preferences without requiring configuration of client-side operating systems are disclosed. Although the present embodiments have been described with reference to specific example embodiments, it will be evident that various modifications and changes may be made to these embodiments without departing from the broader spirit and scope of the various embodiments.

Figure 1:
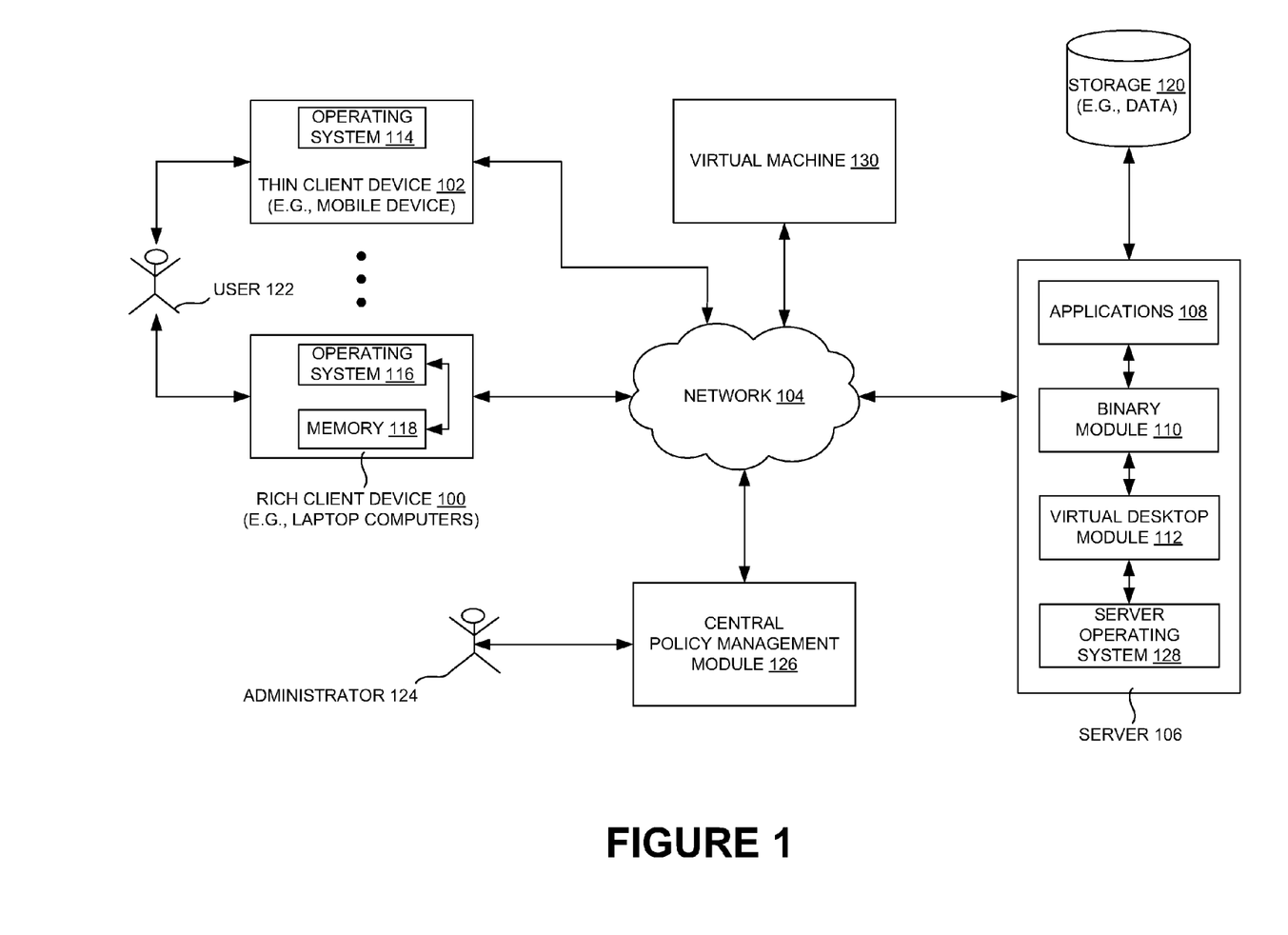
FIG. 1 is a system view of client devices accessing and executing an application installed on a server through a network, according to one embodiment.

In one embodiment, a method of a rich client device (e.g., the rich client device 100 of FIG. 1) includes accessing an application (e.g., the application(s) 108 of FIG. 1) installed on a server (e.g., the server 106 of FIG. 1), and executing the application 108 from the rich client device 100 without installing the application 108 on the rich client device 100 when requested by a user (e.g., the user 122 of FIG. 1) of the rich client device 100 through a binary module (e.g., the binary module 110 of FIG. 1) of the server 106 that emulates a set of function calls between the application 108 and an operating system (e.g., the operating system 116 of FIG. 1) of the rich client device 100.

In another embodiment, a system includes a server (e.g., the server 106 of FIG. 1) having an application (e.g., the application(s) 108 of FIG. 1) installed impendent of any client-side operating system (e.g., the operating system 114/116 of FIG. 1) through a binary module (e.g., the binary module 110 of FIG. 1) of the server 106, a network (e.g., the network 104 of FIG. 1), and a rich client device (e.g., the rich client device 100 of FIG. 1) to access the application 108 installed on the server 106 through the network 104 and to execute the application 108 from the rich client device 100 without installing the application 108 on the rich client device 100 when requested by a user (e.g., the user 122 of FIG. 1) of the rich client device 100 through the binary module 110 of the server 106 that emulates a set of function calls between the application 108 and the operating system 116 of the rich client device 100.

In yet another embodiment, a method of a server (e.g., the server 106 of FIG. 1) includes determining that a coupled device is a rich client device (e.g., the rich client device 100 of FIG. 1) and a thin client device (e.g., the thin client device 102 of FIG. 1) based on a memory, microprocessor, and an identification information of the coupled device, executing an application (e.g., the application(s) 108 of FIG. 1) from the rich client device 100 without installing the application 108 on the rich client device 100 when requested by a user (e.g., the user 122 of FIG. 1) of the rich client device 100 through a binary module (e.g., the binary module 110 of FIG. 1) of the server 106 that emulates a set of function calls between the application 108 and an operating system (e.g., the operating system 116 of FIG. 1) of the rich client device 100, and executing the application 108 directly from a virtual machine through the binary module 110 emulating a set of function calls between the application 108 and the operating system (e.g., the operating system 114 of FIG. 1) of the server 106 without downloading the application 108 to the thin client device 102 when requested by the user 122 of the thin client device 102.

FIG. 1 is a system view of client devices accessing and executing an application installed on a server through a network, according to one embodiment. Particularly, FIG. 1 illustrates a rich client device 100, a thin client device 102, a network 104, a server 106, application(s) 108, a binary module 110, a virtual desktop module 112, an operating system 114, an operating system 116, a memory 118, a storage 120, a user 122, an administrator 124, a central policy management module 126, a server operating system 128, and a virtual machine 130, according to one embodiment.

The rich client device 100 (e.g., the client device that may provide rich functionality independent of the server device) may be a data processing system (e.g., computer, laptop, etc.) that may communicate with the server device (e.g., a file server) for a service (e.g., download application, execute, etc) through the network 104. The thin client device 102 (e.g., the client device that may primarily depend on the server device for processing activities) may be a data processing system (e.g., may mainly focus on conveying input and output between the user 122 and the server device) that may communicate with the server device (e.g., file server) for a service (e.g., download application, execute, etc) through the network 104.

The network 104 (e.g., LAN, WAN, mobile, telecommunications, internet, intranet, WiFi and/or ZigBee network, etc.) may enable communication between the user 122 and the server device (e.g., the server 106). The server 106 is a data processing system (e.g., computer) that may be attached to the network 104 that provides a location for the shared storage of data (e.g., computer files, applications, etc.). The application(s) 108 (e.g., web application) may be the particular class of computer software that may be processed (e.g., accessed, downloaded, executed, etc.) by the user 122 through the client device (e.g., the rich client device 100, the thin client device 102, etc.) from/in the server device (e.g., the server 106). The binary module 110 (e.g., includes required resources between the application and the operating system including a registry data, a file system data, and a Dynamic-Link library (DLL) data) may process requests from the client devices (e.g., using the mark-up language file (XML)) to route requests to the application server.

The virtual desktop module 112 of the server 106 may generate (e.g., recreate) a look and feel (e.g., customization) of a desktop based on the preference of the user 122. The operating system 114 (e.g., "OS") of a rich client device 100 may be a software component that may manage and/or co-ordinate the activities (e.g., sharing of resources, executing applications, management of hardware, memory, etc.) of all other programs (e.g., application programs, etc.) in a data processing system (e.g., computer, laptop, etc.). The operating system 116 (e.g., "OS") of a thin client device 102 (e.g., may be server based) may be a software component that may manage and co-ordinate the activities (e.g., sharing of resources, executing applications, management of hardware, memory, etc.) of all programs (e.g., application programs, etc.) required in a thin client device with a server device (e.g., dependent on the server device).

The memory 118 may be data storage unit in the client device (e.g., hard drive, flash drive, RAM, etc.) that may be used for storing and/or managing data. The storage 120 may be a memory device, a database, etc. that may be used to store/manage the data (e.g., clientIDs, information, application programs, etc.). The user 122 (e.g., a consumer, a patron, etc.) may be a person who may use the client devices (e.g., computer, laptop, mobile device, etc.) to access the applications (e.g., web applications, etc.) through an application interface (e.g., browser, etc.). The administrator 124 (e.g., a patron, an application, etc.) may be manager of the central policy management module 126 who may be enabled combine desktops of multiple users of different client devices (e.g., rich client device 100, thin client device 102, server, etc.) into a single virtualization layer to enable simultaneously and/or concurrently updating process of the application 108 across each of the multiple users.

The central policy management module 126 may manage the communication (e.g., through authentication, etc.) of the client devices (e.g., the rich client device 100 and the thin client device 102) for enabling presentation of the look and feel of the desktop. The server operating system 128 may be an operating system that may manage (e.g., allocation of resources, responses, etc.) and co-ordinate the activities (e.g., accepting request, authentication, data transfer, etc.) of the server device. The virtual machine 130 may be software (e.g., simulated computer) that creates a virtualized environment which works with a host system (e.g., for executing an application without installing the application in the host device) even though it is independent of the host system.

In example embodiment, the user 122 may operate the client devices (e.g., the rich client device 100, the thin client device 102, etc.) to communicate with the server device (e.g., the server 106) through the network 104 for executing an application without installing the application into the client device. The virtual machine 130 may be connected to the network 104. The storage 120 may store the data associated to server 106. The server 106 may be connected to the network 104. The server 106 may include the application(s) 108, the binary module 110, and the virtual desktop module 112. The central policy management module 126 administered by the administrator 124 may be connected to the network 104 that may manage the authentication and/or customization of the look and feel of the preference of the user 122 desktop.

The virtual machine 130 may be coupled to the network 104. The client devices operated by the user 122 may communicate with the server device for an application. The server device may respond to the client device after authentication by providing the application 108. The virtual machine 130 may execute the application on the host device (e.g., the client device). The virtual desktop module 112 of the server 106 may recreate a look and feel of a desktop preference of the user 122 after the central policy management module 126 authenticates the client device.

In one embodiment, the application 108 installed on the server 106 may be accessed by the rich client device 100. The application 108 (e.g., client application, software application etc.) from the rich client device 100 (e.g., personal computer, a laptop etc.) may be executed without installing the application 108 on the rich client device 100 when requested by a user (e.g., the user 122 of FIG. 1) of the rich client device 100 through a binary module (e.g., the binary module 110 of FIG. 1) of the server 106 (e.g., file server, application server etc.) that may emulate (e.g., using the emulation module 200 of FIG. 2) a set of function calls between the application 108 and the operating system 116 of the rich client device 100. The without installing the application 108 on the rich client device 100 may mean that the operating system 116 of the rich client device 100 is not modified to perform the function calls between the application 108 and the operating system 114 and 116.

The application component to the rich client device 100 may be down loaded when requested by a user (e.g., the user 122 of FIG. 1) of the rich client device 100 to a memory (e.g., the memory 118 of FIG. 1) of the rich client device 100. The application component may be deleted from the memory 118 (e.g., hard disk, RAM, magnetic disk etc.) of the rich client device 100 when the application 108 executing on the rich client device 100 is inactive to prevent unauthorized duplication and/or access of the application 108. The thin client device 102 may be determined through the server 106 whether the thin client device 102 is coupled with the server 106. The application 108 may be directly executed from a virtual machine (e.g., the virtual machine 130 of FIG. 1) through the binary module 110 of the server 106 emulating a set of function calls (e.g., using the emulation module 200 of FIG. 2) between the application 108 and an operating system (e.g., the server operating system 128 of FIG. 1) of the server 106 without downloading the application 108 to the thin client device 102 (e.g., workstation, mobile device, etc.).

A look and feel of a desktop preference of the user 122 may be recreated through a virtual desktop module (e.g., the virtual desktop module 112 of FIG. 1) of the server 106. The desktop preference may include an arrangement of files and/or folders in a file system, a color scheme of the file system, a background of the file system, an icon of the file system, an access control preference of the file system, a security preference of the file system, a bookmark associated with the user 122, a temporary file of the file system, a configuration of applications associated with the user 122, and a usability preference associated with the user 122.

The desktop preference may be captured and stored to a user specific area of the server 106 when the desktop preference is in use on the thin client device 102 and the rich client device 100.

The look and feel of the desktop preference of the user 122 may be presented through the rich client device 100, the thin client device 102 and/or other devices based on an authentication of the user 122 with a central policy management module (e.g., the central policy management module 126 of FIG. 1) of a network (e.g., the network 104 of FIG. 1) coupled with the server 106, the rich client device 100, and/or the thin client device 102.

Figure 2:
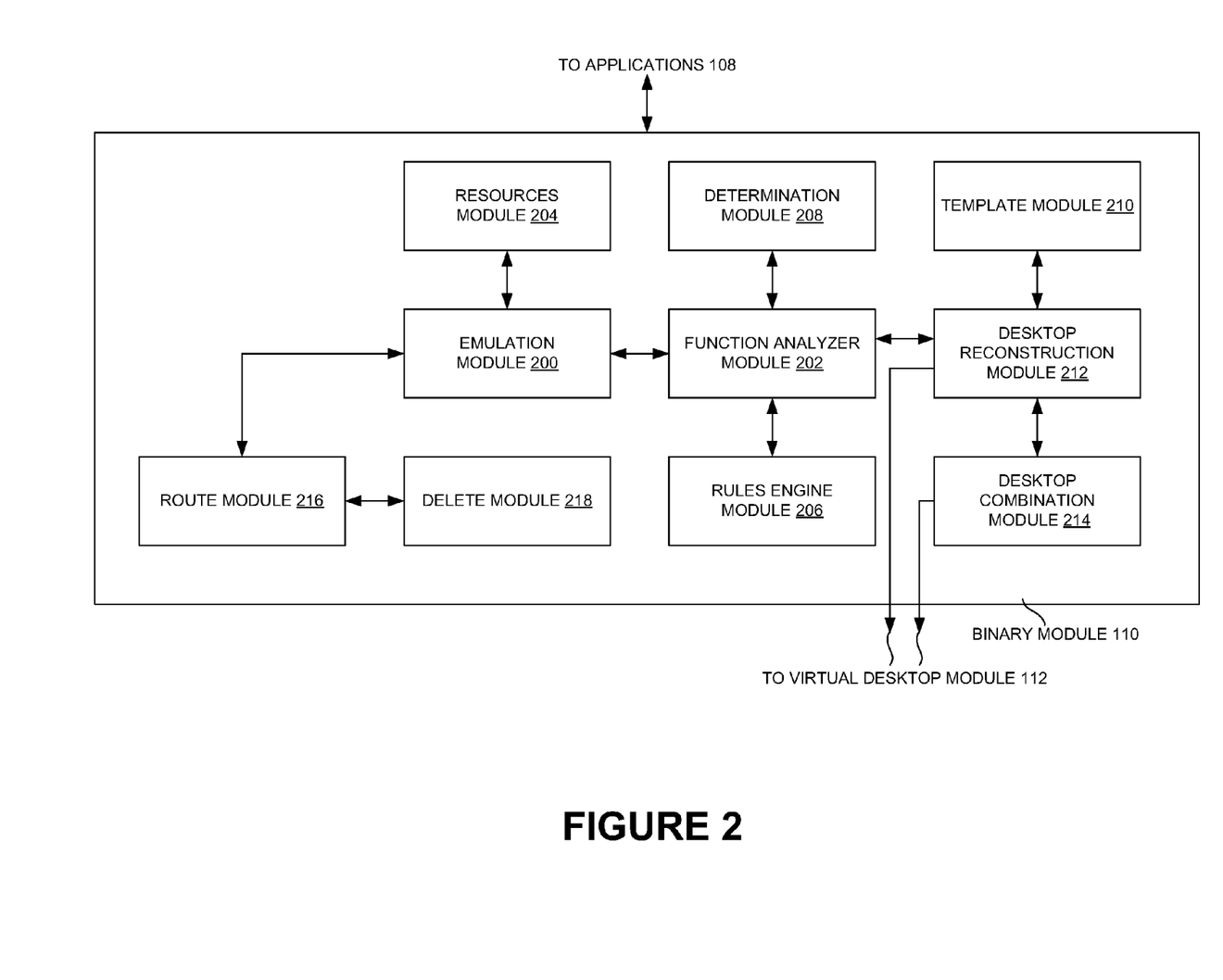
FIG. 2 is an exploded view of a binary module of FIG. 1, according to one embodiment.

Each of the operating system of the different client devices (e.g., the rich client device 100, the thin client device 102 etc.) may be a same type of operating system as a selected one optimized to operate through the binary module 110. The administrator 124 of the central policy management module 126 of the network 104 (e.g., mobile, telecommunications, internet, intranet, WiFi and/or ZigBee network, etc.) may be enabled to use the template module 210 to combine desktops of multiple users of different client devices into a single virtualization layer. The administrator 124 (e.g., may be system administrator, network administrator etc.) may be able to simultaneously and/or concurrently update the application 108 across each of the multiple users.

The update may include a patch installation to the application 108 and/or an upgrade of the application 108. The binary module 110 may include required resources between the application 108 and the server operating system 128 including a registry data, a file system data, and/or a Dynamic-Link library (DLL) data. The server 106 may have an application installed independent of any client-side operating system (e.g., may be operating system 114, operating system 116, etc.) through the binary module 110 of the server 106 (e.g., file server, application server etc.).

The server 106 may determine that the rich client device 100 is the thin client device and may execute the application 108 directly from a virtual machine (e.g., the virtual machine 130 of FIG. 1) through the binary module 110 emulating a set of function calls between the application 108 and the server operating system 128 of the server 106 without downloading the application 108 to the thin client device 102 (e.g., workstation, a mobile device, etc.) when the rich client device 100 is the thin client device 102. It may be determined whether a coupled device is the rich client device 100 and/or the thin client device 102 based on one a memory, microprocessor, and/or an identification information of the coupled device.

The application 108 from the rich client device 100 (e.g., personal computer, a laptop etc.) may be executed without installing the application 108 on the rich client device 100 when requested by the user 122 of the rich client device 100 through the binary module 110 of the server 106 (e.g., file server, application server etc.) that may emulate (e.g., using the emulation module 200 of FIG. 2) a set of function calls between the application 108 and the operating system 116 of the rich client device 100. The application 108 may be directly executed from a virtual machine (e.g., the virtual machine 130 of FIG. 1) through the binary module 110 emulating a set of function calls between the application 108 and the server operating system 128 of the server 106 without downloading the application 108 to the thin client device 102 (e.g., workstation, a mobile device, etc.) when requested by the user 122 of the thin client device 102.

FIG. 2 is an exploded view of the binary module 110 of FIG. 1, according to one embodiment. Particularly, FIG. 2 illustrates the applications 108, the virtual desktop module 112, a emulation module 200, a function analyzer module 202, a resources module 204, a rules engine module 206, a determination module 208, a template module 210, a desktop reconstruction module 212, a desktop combination module 214, a route module 216, and an delete module 218, according to one embodiment.

The emulation module 200 may be a software that may emulate (e.g., duplicates) a set of function calls between the server operating system 128 of the server 106 and the application 108. The function analyzer module 202 may be a software that may analyze the requirement of a particular function for emulation (e.g., may be at the time of access/execution of application 108). The resources module 204 may allot and/or manage the resources (e.g., memory, etc.) for proper execution of the functions in the binary module 110. The rules engine module 206 may determine whether a particular function call needs to be routed to which of the operating system 116 of the rich client device 100 and the required resources of the binary module 110. The determination module 208 may enable the binary module 110 to detect the rich client device 100 and/or the thin client device 102 based on a memory, microprocessor, and/or an identification information of the coupled device. The determination module 208 may also determine that the rich client device 100 is thin client device 102.

The template module 210 may segment an application space from a user profile space on the server 106. The desktop reconstruction module 212 may reconstruct a look and feel desktop of the preference of the user 122. The desktop combination module 214 may combine desktops of multiple users of different client devices into a single virtualization layer. The route module 216 may enable routing of the function calls to a particular operating system of the client device. The delete module 218 may delete the application component from the client device memory (e.g., the rich client device 100) when the application executing on the client device is inactive to prevent unauthorized duplication and/or access of the application 108.

In example embodiment, FIG. 2 illustrates the binary module 110 and its communication with other modules. The function analyzer module 202 may communicate with the emulation module 200, the rules engine module 206, and the determination module 208. The emulation module 200 may communicate with the resources module 204 and the route module 216. The desktop reconstruction module 212 may communicate with the template module 210 and desktop combination module 214. The desktop reconstruction module 212 and the desktop combination module 214 may communicate with the virtual desktop module 112. The binary module 110 may communicate with the application(s) 108.

In one embodiment, the template module (e.g., the template module 210 of FIG. 2) of the binary module 110 may be used to segment an application space from a user profile space on the server 106. The rules engine module (e.g., the rules engine module 206 of FIG. 2) of the binary module 110 may be applied to determine whether a particular function call needs to be routed to which of the operating system 116 of the rich client device 100 and/or the required resources of the binary module 110. The template module (e.g., the template module 210 of FIG. 2) may be applied to segment an application space from a user profile space on the server 106.

Figure 3:
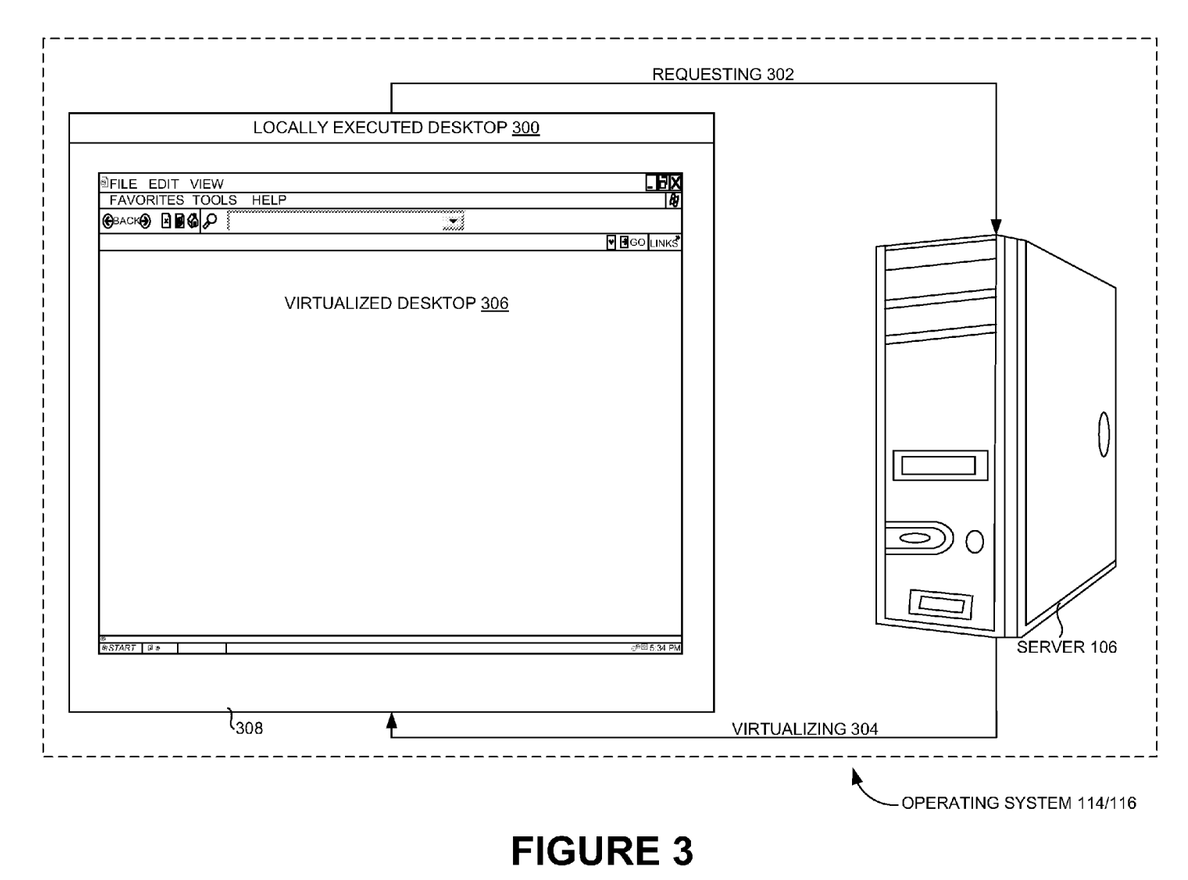
FIG. 3 is a system view of an operating system of the client device, according to one embodiment.

FIG. 3 is a system view of an operating system of the client device, according to one embodiment. Particularly, FIG. 3 illustrates the server 106, the operating system 114/116, a locally executed desktop 300, a requesting 302, a virtualizing 304, and a virtualized desktop 306, according to one embodiment.

The locally executed desktop 300 may be a desktop (e.g., computer screen, mobile screen, etc.) on the client device where the application is presented. The requesting 302 may be a request for customization of look and feel from the user 122 to the server 106 through the client device based on the preference of the user 122. The virtualizing 304 may be the process of creating the virtual desktop through the virtual desktop module 112. The virtualized desktop 306 may be an application (e.g., the virtual desktop) that may be created by the virtual desktop module 112 of the server 106.

In example embodiment, FIG. 3 illustrates communication between the client devices and the server device. The client device (e.g., the rich client device 100 and the thin client device 102) may request (e.g., the requesting 302) for an application 108 from the server device. The server 106 responds the client device (e.g., may detect the client device as the thin client device 102) by virtualizing (e.g., the application 108 required) by using the virtual desktop module 112.

Figure 4:
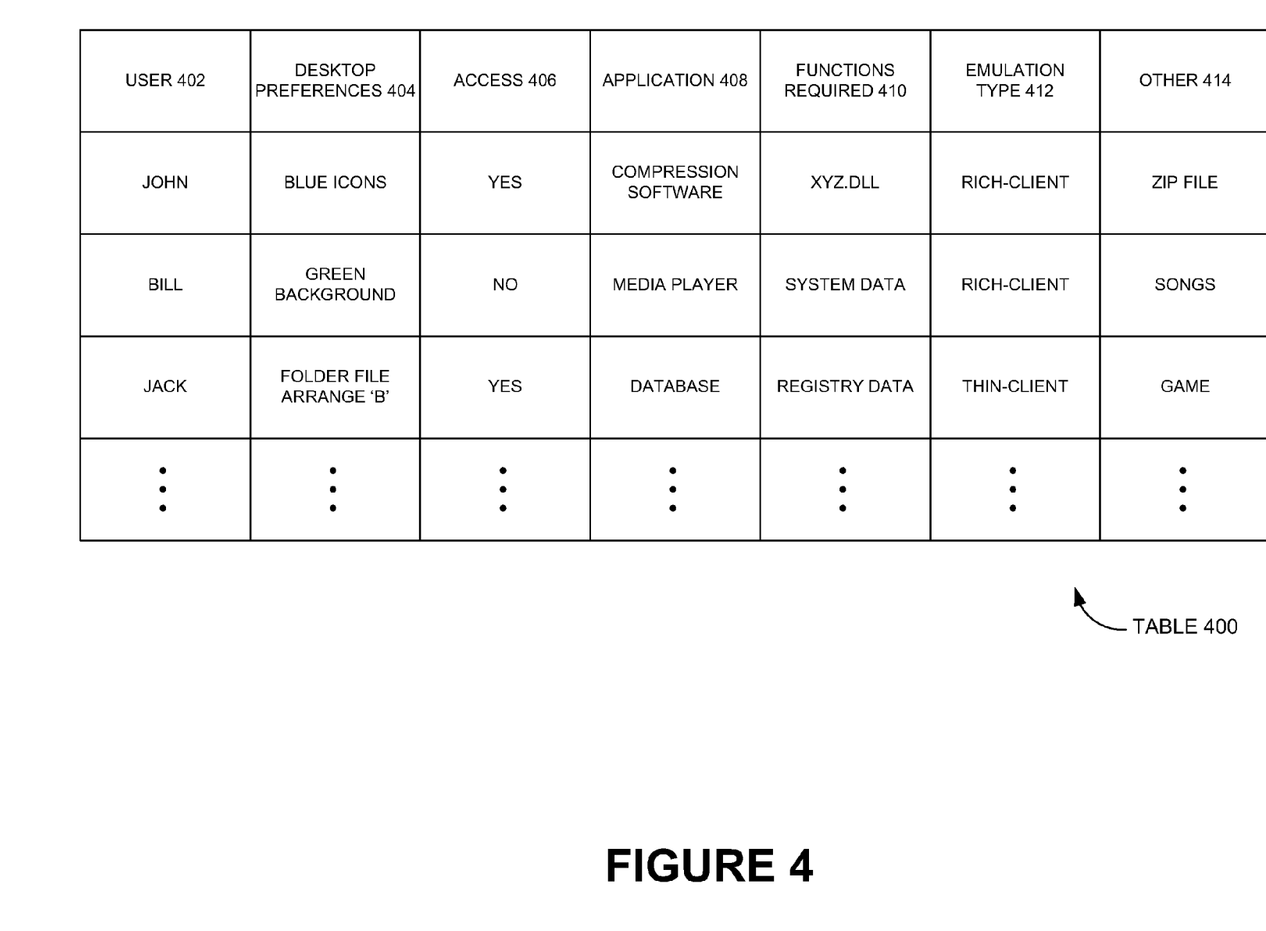
FIG. 4 is a table view illustrating the applications and/or features that are accessed by the user, according to one embodiment.

FIG. 4 is a table view illustrating the applications 108 and/or features that are accessed by the user 122, according to one embodiment. Particularly, FIG. 4 illustrates a user field 402, a desktop preferences field 404, an access field 406, an application field 408, a functions required field 410, an emulation type field 412, and an other field 414, according to one embodiment.

The user field 402 may illustrate the different users of the client devices (e.g., the thin client device 102 and/or the rich client device 100 etc.). The desktop preferences field 404 may illustrate the preference of the user 122 for the look and feel of the desktop preference (e.g., background of the file system, icon of the file system, etc.). The access field 406 may indicate whether the files (e.g., applications, etc.) installed on the server 106 are accessible to the user 122 or not. The application field 408 may indicate the types of the application accessed by the user 122. The functions required field 410 may indicate the functions and/or supporting files that may be required to execute the applications. The emulation type field 412 may indicate to which client device the server 106 may emulate the set of function calls. The other filed 414 may illustrate miscellaneous activities associated to the user 122 with the server 106.

In example embodiment, the user field 402 may illustrate the user names John, Bill, jack in the consecutive rows. The desktop preferences field 404 may illustrate the preferences of the users such as blue icon for John, green background for bill, folder file arrangement for Jack. The access field 406 may indicate permissions such as "yes" for John, "no" for Bill, and "yes" for Jack. The application field 408 may illustrate compression software in the first row, media player in the second row, database in the third row.

The functions required field 410 may illustrate "XYZ.DLL" associated to the application compression for the user John, system data associated for the application media player to the user Bill, and register data associated to the database application to the user Jack in the consecutive rows. The emulation type field 412 may illustrate rich client for the user John, rich client for the user Bill, thin client for the user Jack. The other field 414 may illustrate zip file associated to the user John, songs for the user Bill, and games associated to the user Jack in the consecutive rows.

Figure 5:
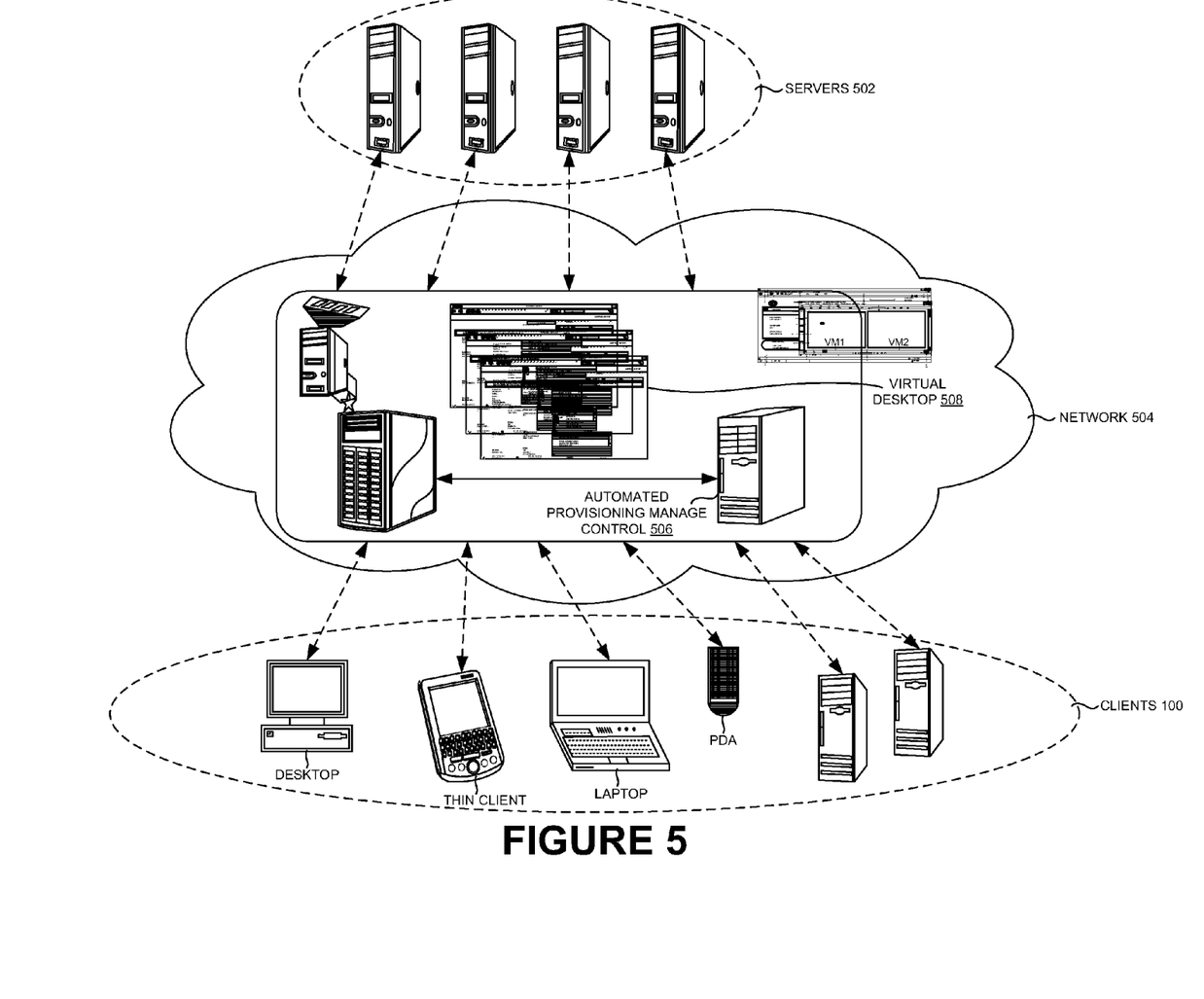
FIG. 5 is a system view illustrating communication between the client devices and the servers through a network, according to one embodiment.

FIG. 5 is a system view illustrating communication between the client devices and the servers through a network, according to one embodiment. Particularly, FIG. 5 illustrates the clients 500, a servers 502, a network 504, an automated provisioning manage control 506, and a virtual desktop 508, according to one embodiment.

The servers 502 may be application server, database server, client server, etc. that may provide services (e.g., communicating the application, etc.) to the client devices. The network 504 may be internet, LAN, wireless, etc that may enable communication between the servers 502 and the clients 500. The automated provisioning manage control 506 may manage the controlling of the functionalities of the servers 502 and the clients 500 automatically. The virtual desktops 508 may be the products that are developed by the virtual desktop module 112 in the virtual machine attached to the network.

In example embodiment, the clients 500 (e.g., thin client, laptop, desktop computer etc.) may communicate with the servers 502 through the network 504. The network 504 may include the virtual desktop to be viewed that may be preferred by the user 122. The automated provisioning manage control 506 in the network 504 may manage the servers 502 and the clients 500. The virtual desktops 508 may be created by the virtual desktop module 112 in the virtual machine that may be targeted to the client device.

Figure 6:
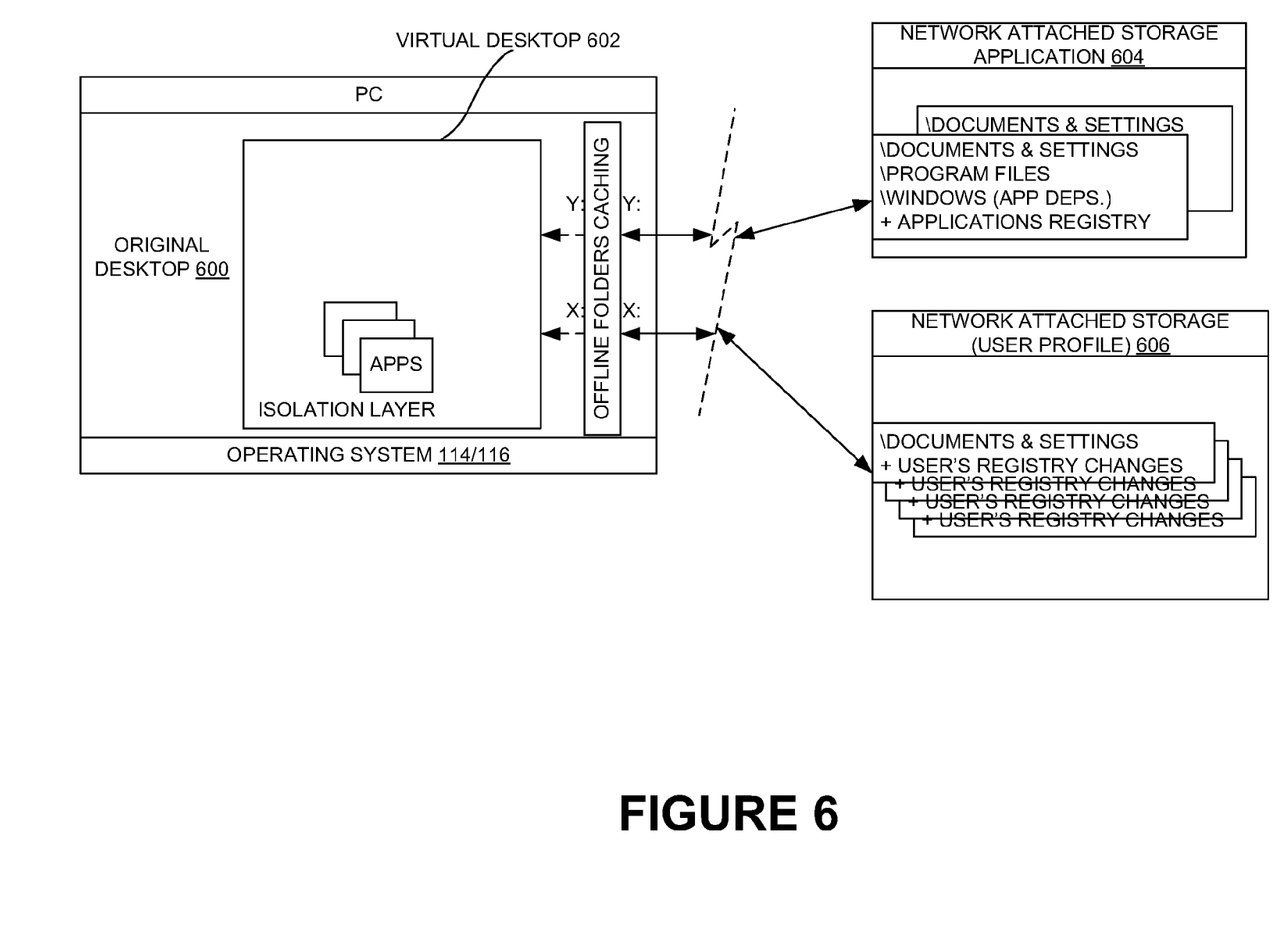
FIG. 6 is a system view illustrating the data communication (e.g., application 108 execution) between the desktop of the client device and the server, according to one embodiment.

FIG. 6 is a system view illustrating the data communication (e.g., application 108 execution) between the desktop of the client device and the server 106, according to one embodiment. Particularly, FIG. 6 illustrates an original desktop 600, a virtual desktop 602, a network attached storage 604, a network attached storage (e.g., user profile) 606, according to one embodiment.

The original desktop 600 may be the presentation area (e.g., desktop, mobile screen, etc.) where the application 108 will be presented in the presentable form (e.g., visually, through sound, etc.). The virtual desktop 602 may be presentation created using the virtual desktop module 112 and presented within the original desktop 600. The network attached storage 604 may be storage area in the network 104 (e.g., webspace, etc.) that may enable storage, hold, etc. the data (e.g., applications, etc.). The network attached storage (e.g., user profile) 606 may be a storage area (e.g., database) that may hold the information associated to the user profile.

In example embodiment, FIG. 6 illustrates the application 108 execution in the virtual desktop 602 within the original desktop 600. The application component may be accessed from the network attached storage 604. The authentication and access of user information may be done through the network attached storage (e.g., user profile).

Figure 7:
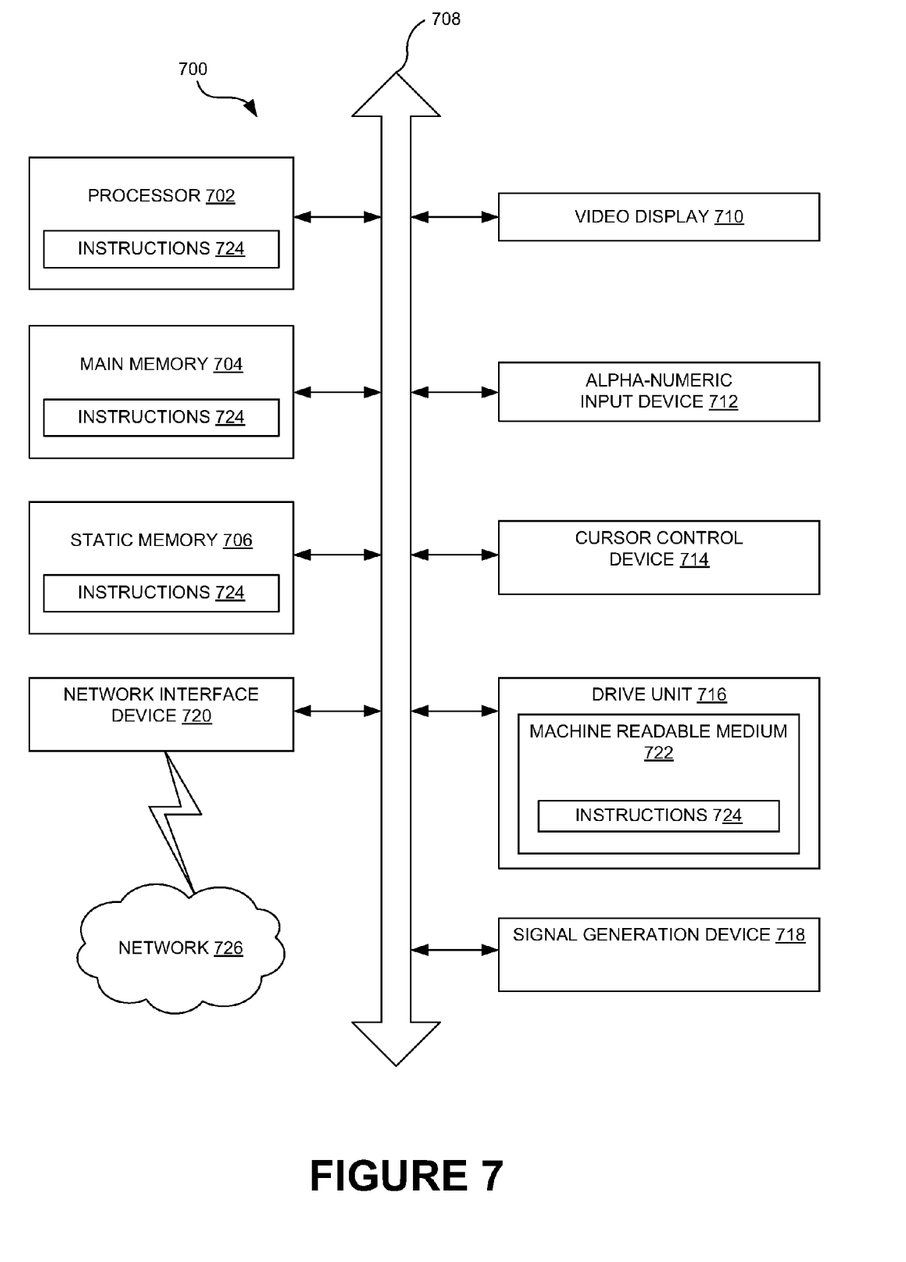
FIG. 7 is a diagrammatic system view of a data processing system in which any of the embodiments disclosed herein may be performed, according to one embodiment, according to one embodiment.

FIG. 7 is a diagrammatic system view of a data processing system in which any of the embodiments disclosed herein may be performed, according to one embodiment, according to one embodiment. Particularly, FIG. 7 illustrates the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and/or the data processing system in which one or more operations disclosed herein are performed. The processor 702 may be a microprocessor, a state machine, an application specific integrated module, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically handicapped).

The cursor control device 714 may be a pointing device such as a mouse. The drive unit 716 may be the hard drive, a storage system, and/or other longer term storage subsystem. The signal generation device 718 may be a bios and/or a functional operating system of the data processing system. The network interface device 720 may be a device that performs interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one or more operations disclosed herein.

Figure 8A:
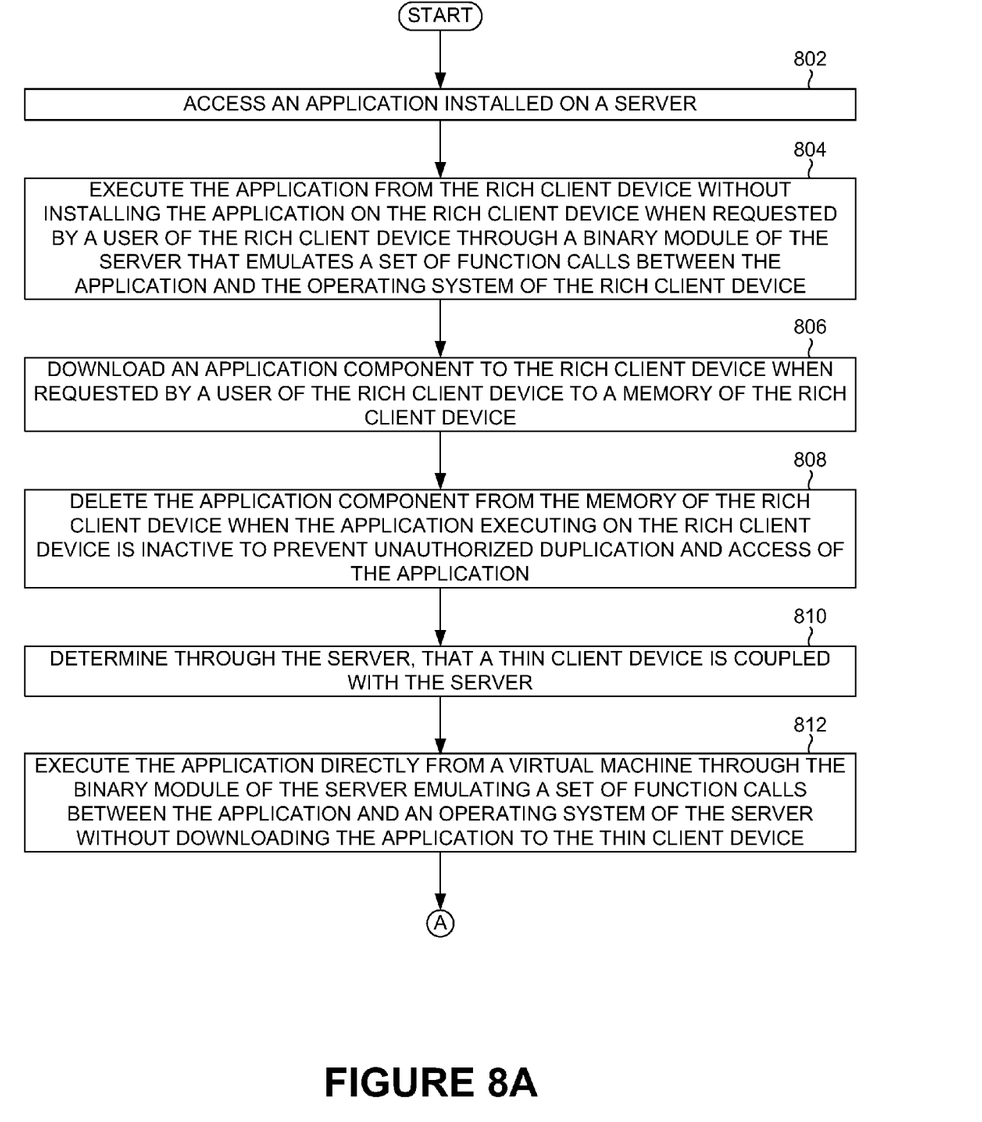
FIG. 8A is a flow diagram of accessing an application installed on the server, according to one embodiment.

FIG. 8 is a process flow of accessing an application installed on a server, according to one embodiment. In operation 802, an application (e.g., the application(s) 108 of FIG. 1) installed on a server (e.g., the server 106 of FIG. 1) may be accessed (e.g., using the client devices like rich client device 100, thin client device 102, etc.). In operation 804, the application 108 from the rich client device 100 may be executed without installing the application 108 on the rich client device 100 (e.g., without installing the application on the rich client device 100 may mean that an operating system (e.g., the operating system 116 of FIG. 1) of the rich client device 100 is not modified to perform the function calls between the application 108 and the operating system 116 when requested by a user (e.g., the user 122 of FIG. 1) of the rich client device 100 through a binary module (e.g., the binary module 110 of FIG. 1) (e.g., the binary module may be required resources between the application and the operating system including a registry data, a file system data, and/or a Dynamic-Link library (DLL) data) of the server 106 that emulates (e.g., using the emulation module 200 of FIG. 2) a set of function calls between the application and an operating system of the rich client device.

In operation 806, an application component may be downloaded to the rich client device 100 when requested by a user (e.g., the user 122 of FIG. 1) of the rich client device 100 to a memory of the rich client device 100. In operation 808, the application 108 may be deleted (e.g., using the delete module 218 of FIG. 2) from the memory of the rich client device 100 when the rich client device 100 is inactive to prevent unauthorized duplication and access of the application 108. In operation 810, it may be determined (e.g., using the determination module 208 of FIG. 2) through the server 106, that a thin client device (e.g., the thin client device 102 of FIG. 1) is coupled with the server 106. In operation 812, the application 108 may be executed directly from a virtual machine through the binary module 110 the server 106 emulating a set of function calls (e.g., using the emulation module 200 of FIG. 2) between the application 108 and an operating system 114 of the server 106 without downloading the application 108 to the thin client device 102.

Figure 8B:
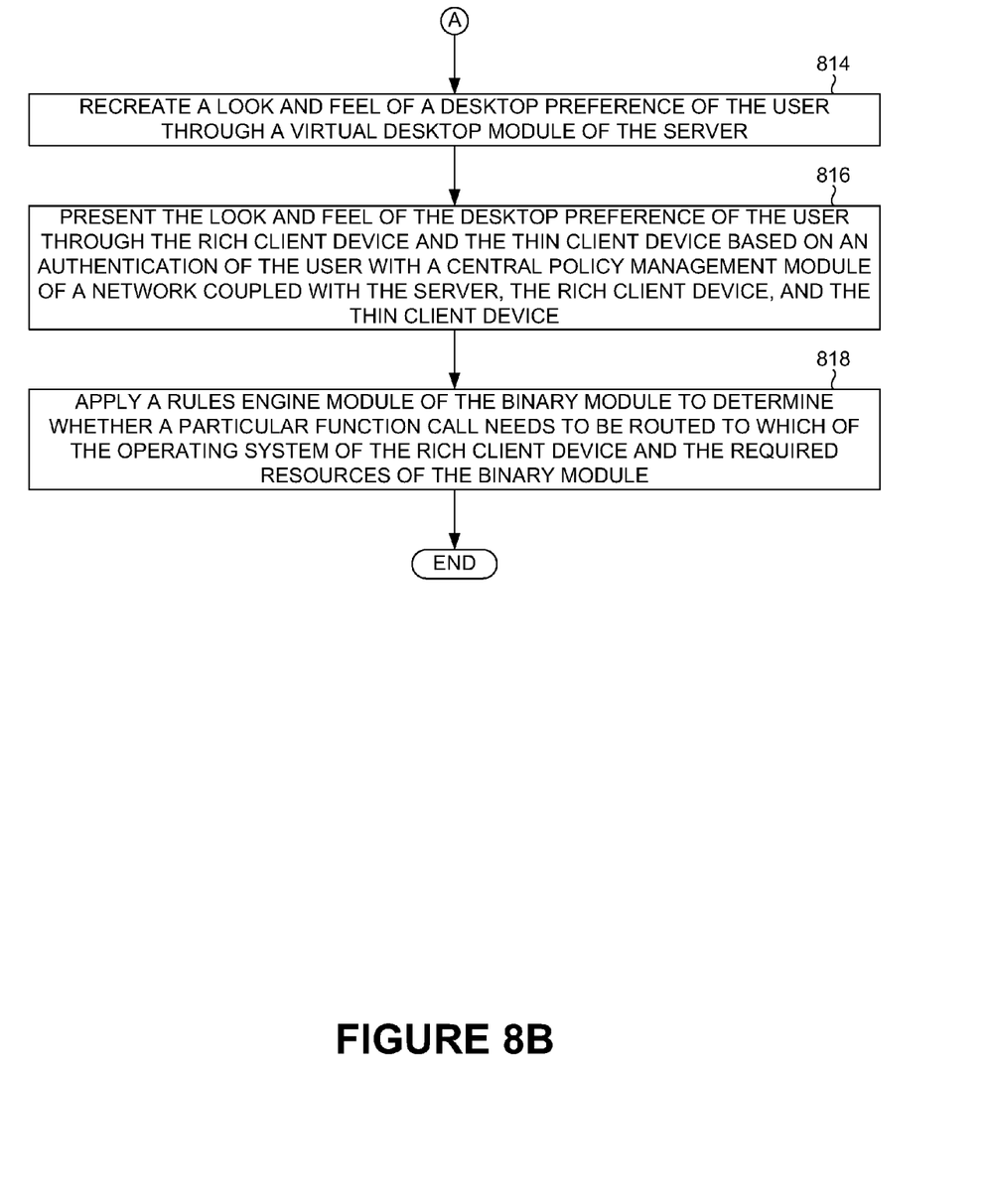
FIG. 8B is continuation of a process flow of FIG. 8A, according to one embodiment.

In operation 814, a look and feel of a desktop preference (e.g., the desktop preference may be an arrangement of files and folders in a file system, a color scheme of the file system, a background of the file system, an icon of the file system, an access control preference of the file system, a security preference of the file system, a bookmark associated with the user, a temporary file of the file system, and/or a usability preference associated with the user) of the user 122 may be recreated through a virtual desktop module (e.g., the virtual desktop module 112 of FIG. 1) of the server 106.

In operation 816, the desktop preference may be captured and stored to a user specific area of the server 106 when the desktop preference is in use on the thin client device 102 and the rich client device 100.

In operation 818, the look and feel of the desktop preference of the user 122 may be presented through the rich client device 100, the thin client device, and other devices based on an authentication of the user 122 with a central policy management module (e.g., the central policy management module 126 of FIG. 1) of a network (e.g., the network 104 of FIG. 1) coupled with the server 106, the rich client device 100 and the thin client device 102. In operation 820, an administrator (e.g., the administrator of FIG. 1) of the central policy management module 126 of the network 104 may be enabled to use the template module 210 to combine desktops (e.g., using the desktop combination module 214 of FIG. 2) of multiple users of different client devices into a single virtualization layer such that the administrator 124 is able to simultaneously and concurrently update the application 108 across each of the multiple users.

The update may include a patch installation to the application 108, an upgrade of the application 108, etc. In operation 822, a rules engine module (e.g., the rules engine module 206 of FIG. 2) of the binary module 110 may be applied to determine whether a particular function call needs to be routed (e.g., using the route module 216 of FIG. 2) to which of the operating system 116 of the rich client device 100 and the required resources. The template module 210 may be used to segment an application 108 space from a user profile space on the server 106. Each operating system 116/114 of the different client devices may be a same type of operating system as a selected one optimized to operate through the binary module 110.

Figure 9:
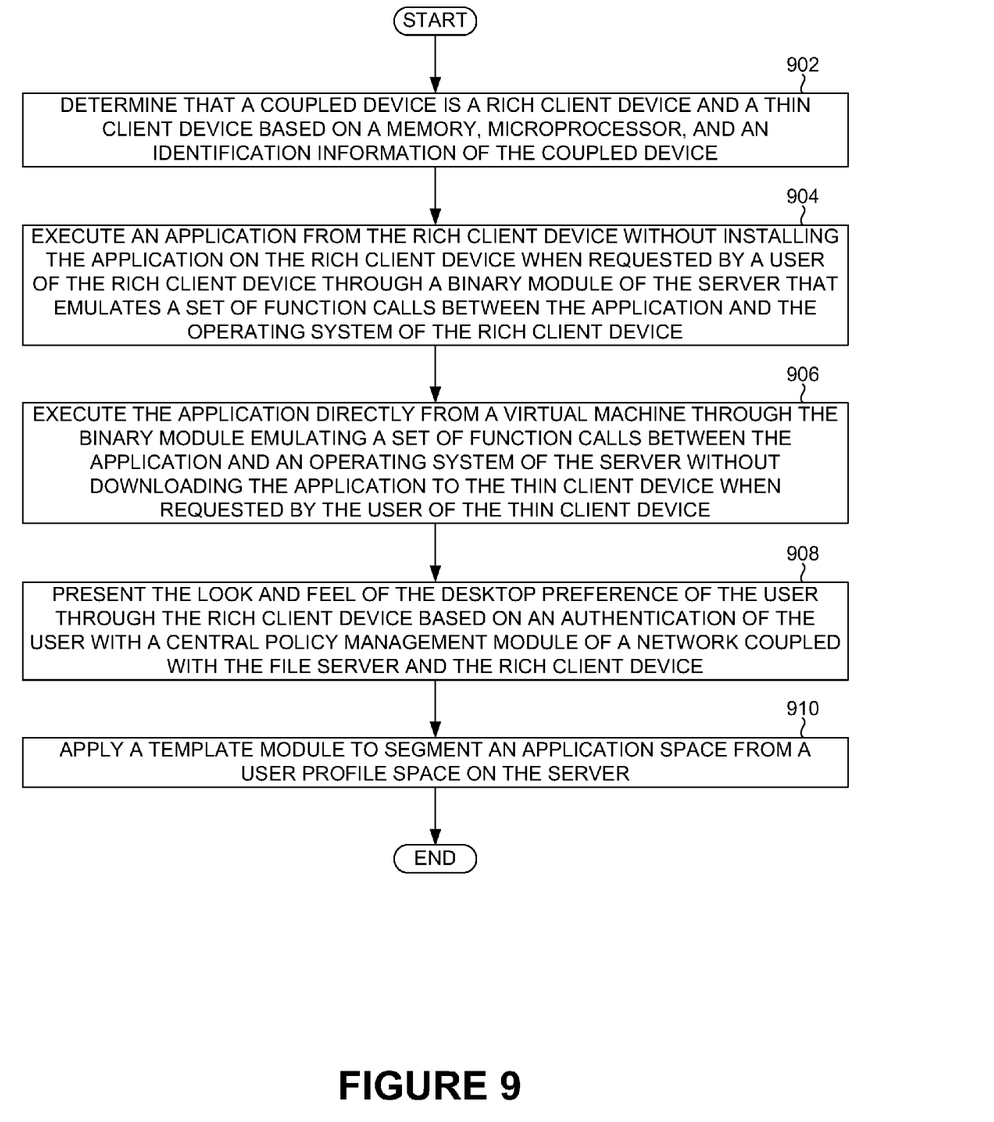
FIG. 9 is a process flow of applying a template module to segment an application space from a user profile on the server, according to one embodiment.

FIG. 9 is a process flow of applying the template module 210 to segment an application space from a user profile on the server 106, according to one embodiment. In operation 902, it may be determined that a coupled device may be a rich client device (e.g., the rich client device 100 of FIG. 1) and a thin client device (e.g., the thin client device 102 of FIG. 1) based on a memory, microprocessor, and/or an identification information of the coupled device. In operation 904, an application (e.g., the application 108 of FIG. 1) may be executed from the rich client device 100 without installing the application 108 on the rich client device 100 when requested by a user (e.g., the user 122 of FIG. 1) of the rich client device 100 through a binary module (e.g., the binary module 110 of FIG. 1) of the server (e.g., the server 106 of FIG. 1) that emulates a set of function calls between the application 108 and an operating system (e.g., the operating system 116 of FIG. 1) of the rich client device 100. In operation 906, the application 108 may be executed directly from a virtual machine through the binary module 110 emulating a set of function calls between the application 108 and the operating system 116 of the server 106 without downloading the application 108 to the thin client device 102 when requested by the user 122 of the thin client device 102.

In operation 908, a look and feel of a desktop preference (e.g., the desktop preference may be an arrangement of files and folders in a file system, a color scheme of the file system, a background of the file system, an icon of the file system, an access control preference of the file system, a security preference of the file system, a bookmark associated with the user 122, a temporary file of the file system, and/or a usability preference associated with the user) of the user 122 may be recreated through a virtual desktop module (e.g., the virtual desktop module 112 of FIG. 1) of the server 106. In operation 910, the look and feel of the desktop preference of the user 122 may be presented through the rich client device 100 based on an authentication of the user 122 with a central policy management module (e.g., the central policy management module 126 of FIG. 1) of a network (e.g., the network 104 of FIG. 1) coupled with the server 106 and the rich client device 100. In operation 912, a template module 210 may be applied to segment an application space from a user profile space on the server 106.

In operation 914, an administrator (e.g., the administrator 124 of FIG. 1) of the central policy management module 126 of the network 104 may be enabled to use the template module 210 to combine desktops (e.g., using the desktop combination module 214 of FIG. 2) of multiple users of different client devices into a single virtualization layer such that the administrator 124 is able to simultaneously and concurrently update (e.g., the update may include a patch installation to the application and an upgrade of the application) the application 108 across each of the multiple users.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the binary module 110, the virtual desktop module 112, the central policy management module 126, the emulation module 200, the function analyzer module 202, the resources module 204, the rules engine module 206, the determination module 208, the template module 210, the desktop reconstruction module 212, the desktop combination module 214, the route module 216, and the delete module 218 may be enabled using software and/or using transistors, logic gates, and electrical circuits (e.g., application specific integrated ASIC circuitry) such as a binary circuit, a virtual desktop circuit, a central policy management circuit, a emulation circuit, a function analyzer circuit, a resources circuit, a rules engine circuit, a detection circuit, a template circuit, a desktop reconstruction circuit, a desktop combination circuit, a route circuit, and a delete circuit and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of centralized management of applications and desktop preferences, comprising:

identifying a client device coupled to a server through a network through a binary module executing on the server in accordance with a request from a user of the client device for an application capable of being served through the server by the binary module emulating a set of function calls between the application and an operating system of the client device determined by the binary module;

executing, in accordance with the request from the user of the client device, the application from the client device without downloading or installing the application on the client device or modifying an operating system of the client device through the binary module emulating a set of function calls between the application and the operating system of the client device;

facilitating recreating a look and feel of a desktop preference of the user of the client device through a virtual desktop module of the server, capturing and storing the desktop preference to a user specific area of the server when the desktop preference is in use on the client device through a central policy management module coupled to the network, and presenting the look and feel of the desktop preference of the user through at least one of the client device and other devices of the network based on authenticating the user with the central policy management module;

segmenting, through the binary module, an application space from a user profile space on the server; and selecting a same type of operating system of each of a plurality of client devices on the network coupled to the server to operate through the binary module.

2. The method of claim 1, further comprising:
downloading a component of the application to the client device when requested by a user of the client device to a memory of the client device,
wherein the memory of the client device is a volatile memory; and
deleting, through a delete module of the binary module, the component of the application from the memory of the client device when the application executing on the client device is inactive to prevent unauthorized duplication and access of the application.

3. The method of claim 1, wherein the desktop preference includes at least one of an arrangement of files and folders in a file system, a color scheme of the file system, a background of the file system, an icon of the file system, an access control preference of the file system, a security preference of the file system, a bookmark associated with the user, a temporary file of the file system, a configuration of applications associated with the user, and a usability preference associated with the user.

4. The method of claim 1, further comprising:
combining, through an administrator of the central policy management module of the network, desktops of a plurality of users of the plurality of client devices into a single virtualization layer such that the administrator is able to simultaneously and concurrently update the application across each of the plurality of users, the update including at least one of a patch installation to the application and an upgrade of the application.

5. The method of claim 1, wherein the binary module includes required resources between the application and the operating system including a registry data, a file system data, and a Dynamic-Link library (DLL) data.

6. The method of claim 5, further comprising:
determining, through a rules engine module of the binary module emulating a set of function calls between the application and the operation system of the client device whether a particular function call needs to be routed to a particular operating system of the client device and the required resources of the binary module therefore,
wherein a function analyzer module may analyze the requirement of a particular function for emulation,
wherein a resources module may allot and/or manage the resources for proper execution of the functions in the binary module.

7. The method of claim 1, wherein at least one of:
executing the application on the client device if the client device is a rich client device without installing the application on the rich client device when requested by the user of the thin client device;
executing the application directly from the virtual machine when the client device is a thin client device without downloading the application to the thin client device when requested by the user of the thin client device; and
the network is based on one of: a wireless network, Internet, Intranet, WiFi® and Zigbee®.

8. A system, comprising:
a plurality of client devices;
a network; and
a server configured to serve an application to a client device of the plurality of client devices through the network in accordance with a request therefrom, the server comprising:
executing a binary module configured to, in accordance with the request: identify the client device originating the request, execute the application from the client device without downloading or installing the application on the client device or modifying an operating system of the client device through emulating a set of function calls between the application and an operating system of the client device;
facilitating recreating a look and feel of a desktop preference of the user of the client device through a virtual desktop module of the server, capturing and storing the desktop preference to a user specific area of the server when the desktop preference is in use on the client device through a central policy management module coupled to the network, and presenting the look and feel of the desktop preference of the user through at least one of the client device and other devices of the network based on authenticating the user with the central policy management module;
segmenting, through the binary module, an application space from a user profile space on the server; and
selecting a same type of operating system of each of a plurality of client devices on the network coupled to the server to operate through the binary module.

9. The system of claim 8, further comprising:
downloading a component of the application to the client device when requested by a user of the client device to a memory of the client device,
wherein the memory of the client device is a volatile memory, and
deleting, through a delete module of the binary module, the component of the application from the memory of the client device when the application executing on the client device is inactive to prevent unauthorized duplication and access of the application.

10. A non-transitory computer readable medium, readable through a computing system and including instructions embodied therein configured to be executable on the computing system, comprising:
instructions associated with identifying a client device coupled to a server through a network through a binary module executing on the server in accordance with a request from a user of the client device for an application capable of being served through the server by the binary module emulating a set of function calls between the application and an operating system of the client device determined by the binary module;

instructions associated with executing, in accordance with the request from the user of the client device, the application from the client device without downloading or installing the application on the client device or modifying an operating system of the client device through the binary module emulating a set of function calls between the application and the operating system of the client device; and instructions associated with facilitating recreating a look and feel of a desktop preference of the user of the client device through a virtual desktop module of the server, capturing and storing the desktop preference to a user specific area of the server when the desktop preference is in use on the client device through a central policy management module coupled to the network, and presenting the look and feel of the desktop preference of the user through at least one of the client device and other devices of the network based on authenticating the user with the central policy management module;

instructions associated with segmenting, through the binary module, an application space from a user profile space on the server; and selecting a same type of operating system of each of a plurality of client devices on the network coupled to the server to operate through the binary module.

11. The non-transitory computer readable medium of claim 10, further comprising instructions associated with combining desktops of a plurality of users of a plurality of client devices on the network into a single virtualization layer such that the administrator is able to simultaneously and concurrently update the application across each of the plurality of users, the update including at least one of a patch installation to the application and an upgrade of the application.

* * * * *